Figure 1:
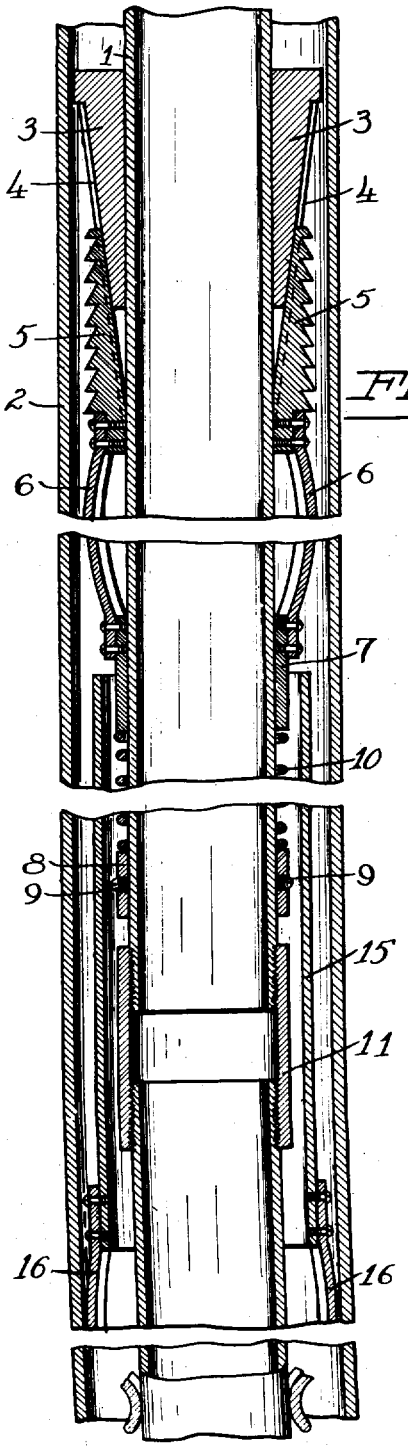

W. H. McKISSICK.

TUBING CATCHER FOR OIL WELLS OR THE LIKE.

APPLICATION FILED APR. 1, 1920.

Reissued Mar. 29, 1921. 15,075.

Inventor:
W. H. McKissick;
By Raymond Hull Stevens,
Attorney.

UNITED STATES PATENT OFFICE.

WILLIAM H. McKISSICK, OF TULSA, OKLAHOMA, ASSIGNOR OF ONE-HALF TO DUNN MANUFACTURING COMPANY, OF OXNARD, CALIFORNIA.

TUBING-CATCHER FOR OIL-WELLS OR THE LIKE.

15,075. Specification of Reissued Letters Patent. Reissued Mar. 29, 1921.

Original No. 1,201,483, dated October 17, 1916, Serial No. 42,158, filed July 27, 1915. Application for reissue filed April 1, 1920. Serial No. 370,561.

*To all whom it may concern:*

Be it known that I, WILLIAM H. McKISSICK, a citizen of the United States, residing at Tulsa, in the county of Tulsa and State of Oklahoma, have invented new and useful Improvements in Tubing-Catchers for Oil-Wells or the like, of which the following is a specification.

This invention relates to certain improvements in tubing catchers for oil wells or the like, and it is an object of the invention to provide a device of this general character of a novel and improved construction insertible within the casing and which serves to automatically grab the same should the tubing fall.

The invention consists in the provision of means which act responsive to the fall of the tubing whereby parts are relatively moved so as to expand or force outwardly jaws or dogs which thereupon become wedged against the casing and serve to support the tubing against further drop. These means so act in accordance with the principle which applies when two falling bodies are acted upon by an agency tending to separate them or force one upwardly and the other downwardly. In practising the invention the string of tubing acts as one falling body, and the jaws or dogs act as the other falling body or bodies, and a normally compressed spring is provided which exerts a push downwardly upon the string of tubing and upwardly on the jaws or dogs. As long as the string of tubing, jaws or dogs and spring remain at rest, the jaws or dogs occupy a normal position of retraction. The dogs or jaws are mounted to coöperate with wedges or a body having beveled or upwardly and outwardly inclined faces. It therefore results that when a drop of the several mentioned parts takes place, including these wedges or the part with the oppositely beveled faces, that the spring acts or exerts a tendency to push the tubing downwardly, together with the wedge portions upon it and to push the jaws or dogs upwardly. In other words, the tubing and wedge portions will fall faster than the dogs or jaws, and the result is that the wedge portions force the dogs or jaws outwardly so that their teeth are engaged with the casing of the well and firmly jammed or wedged between the wedge portions and the casing, thus supporting the string of tubing with all the features mentioned, against further fall. It is to be understood, however, that the string of tubing with the attendant features mentioned may be lowered all together slowly within the well casing, in bringing the string of well tubing and other parts into proper position for service, or in adding extra lengths of well tubing to the string. If this be done slowly the expansion of the jaws or dogs will not occur. Also of course the string of tubing and attendant features may be raised without causing the wedging action of the jaws or dogs. At any time, however, either during the lowering of the string of tubing and attendant features, or during their normal positioning in the well or casing, or during the withdrawal or elevation of them in or through the well or its casing, if a sudden drop of the string of tubing and the mentioned parts and features takes place, there will occur the automatic action resulting in a wedging of the jaws or dogs to support the string of tubing and attendant features. Thus, if a break takes place in the string of tubing above the tubing catcher features mentioned, or the means suspending the string of tubing in the casing fails or breaks, the string of tubing and its attendant parts will automatically be arrested and caught in the casing after a very small initial drop, ordinarily of from three to five inches, and not more.

Prior to my invention others have attempted to devise, and have devised devices for locking and holding tubing in oil wells, but none of the same have been capable of automatic action at all the times and in all the respects and under all the conditions mentioned. Inasmuch as strings of tubing in oil and other wells are often of extreme length, at times three to four or five thousand feet, it will be obvious that should such a string of tubing drop in a well or its casing, it must of necessity buckle and corkscrew the tubing, destroy the structure of the well or the casing therein, or injure the same, destroy the pump barrel and pump rods which deliver oil through the tubing, or injure the same, and in any event cause to a greater or lesser degree costly injury, suspension of pumping operations, or frequently irreparable damage. By providing a string of tubing with my invention, these untoward and damaging and expensive repensive results and occurrences incident to tubing dropping, are entirely obviated, as has been found in extensive practice.

A prior attempt has been made to provide a well tubing support utilizing a spring compressed between parts of a divided pump tubing, the said tubing being thus formed in two separate sections. To the best of my knowledge the device described and pictured in this patent was useless, inasmuch as it could not be used above the pump barrel, where over 90 per cent of tubing catchers are used, for the reason that the broken or interrupted string of tubing provided an opening causing an air and oil leakage in the tubing. This would entirely prevent pumping. Furthermore, the spring could only expand as fast as further oil or air could get into the spring chamber, and this retardation of action would prevent sufficiently speedy catching operation, particularly under oil. Likewise sand and oil would accumulate in this spring chamber and interfere with the action of the parts. As far as I am informed, no device including such a broken or interrupted string of tubing with a spring compressed between the parts, was ever successfully operated, although attempted.

I have found that the invention organized as I have described my invention in general terms has been extremely satisfactory in service, and this form of my tubing catcher has become in general the standard form of tubing catcher in service today. Likewise in certain respects the invention pertains to details of construction and the combination and arrangement of the several parts of my improved tubing catcher for oil wells or the like whereby certain important advantages are attained.

Further advantages of the present invention consists in its relative simplicity and inexpensiveness of construction and its general capacity for service under demands of widely varying conditions to be met with, and superiority in durability and general serviceability.

The invention is disclosed in the following description, in its mechanical embodiment in one form, and in that form is shown in the drawing, and the invention is finally pointed out in claims. I likewise provide means whereby the operation of the tubing catcher may be voluntarily caused to lock the string of tubing and attendant parts in connection with the casing at any point in the well in which it is so desired to position the same. This, however, is only a feature of secondary importance.

It will be understood that many variations in construction and organization and relative arrangement of parts and features may be made in practising the invention, without departing from the spirit of the invention.

In order that my invention may be the better understood, I will now proceed to describe the same with reference to the accompanying drawings, wherein—

Figure 2:
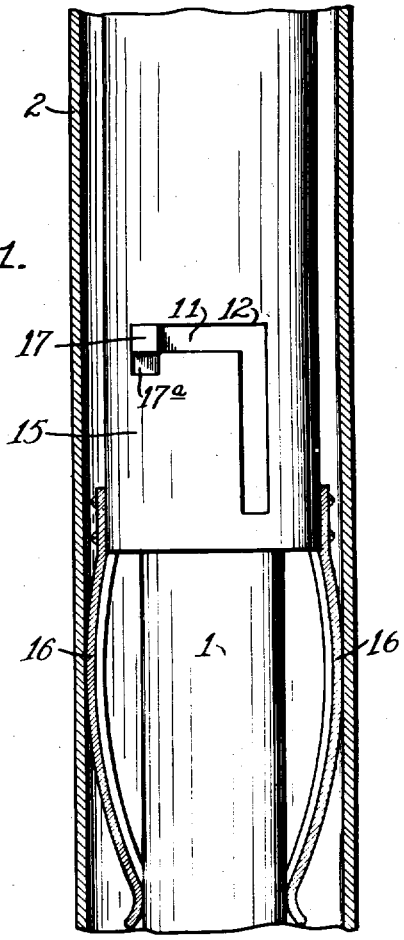

Figure 1 is a vertical sectional view illustrating a tubing catcher and portion of a string of well tubing constructed and combined in accordance with an embodiment of my invention; and, Fig. 2 is a view, partly in elevation and partly in section, of one extremity of said device as partially shown in Fig. 1.

Corresponding parts are similarly designated throughout.

As disclosed in the accompanying drawing, 1 denotes a tubing section of conventional form disposed within the casing 2. My improved tubing catcher, as herein embodied, consists of the sleeve 3 having the diametrically opposed beveled faces 4 with which co-act the slips or friction jaws or dogs 5, in a manner substantially identical to that set forth in my Patent No. 1,147,108 which was granted July 20, 1915, and of which the present application is an improvement.

The sleeve 3 is preferably fast upon the tubing 1. It will be understood that the tubing 1 is ordinarily composed of a number of sections or lengths and that the pump rods (not shown) extend down through the same and operate a pump in a pump barrel at the lower portion of the well tubing. These parts likewise are not shown, not being part of the present invention.

Operatively engaged with and depending from the slips or jaws 5 are the flexible bowed irons 6 having their lower extremities secured to the sleeve 7 suitably applied to the tubing 1. Surrounding the tubing 1 at a predetermined point below the sleeve 7 is a second sleeve 8 capable of movement longitudinally of the tubing 1 and locked in a predetermined adjustment through the medium of the binding screws 9, said adjustment of the sleeve 8 serving to regulate the position of the slips 5 and the extent of movement necessary to bring them into operative position, it being understood that the sleeve 7 is capable of free movement longitudinally of the tubing 1. The sleeve 7 acts in addition to the flexible bowed irons 6 and the jaws or slips 5 to exert normally a compression or compressive action upon the spring 10. Under normal conditions the sleeve 7 together with the irons 6 and jaws 5 will place the spring 10 under slight compression, whereby it will be perceived that the spring 10 serves under normal conditions to afford a vibratory support for the sleeve 7 and its concomitant parts.

In the event the tubing 1 should drop, the said tubing and all of the elements carried thereby would fall by gravity in accordance with the law of falling bodies. It will be remembered, however, that the spring 10 is normally compressed and maintained under tension by the weight of the slips 5, arms 6, and sleeve 7. The respective ends of the coil spring 10 thus exert a downward thrust upon the collar 8, which is rigidly clamped upon the tubing, and an upward thrust upon the sleeve 7 which carries the slips or jaws 5. When the tubing drops the spring accordingly has a tendency to accelerate the fall of the tubing and to retard the fall of the slips or jaws 5. Owing to the relatively large mass of the tubing 1, however, the action of the spring 10 in accelerating the drop thereof is really negligible and the practical result is to retard the drop of the slips 5. There is thus a relative movement between the tubing 1 and slips 5 which causes the said slips to be expanded into engagement with the casing tube by the action of the cone or wedge 3. The slips 5 are thus brought very quickly into engagement with the well casing with the result that the tubing 1 is checked in its downward movement and supported within the casing by the slips before it has dropped sufficiently far to do any real damage to the well. The extent of the relative movement between the slips 5 and the well tubing which is necessary before the slips engage the well tubing, is regulated by adjusting the sleeve 8 up and down upon the tubing, and the proper adjustment for obtaining quick action of the slips can be readily made. Of course, there is no relative movement of the slips and well tubing when the tubing is moved slowly up and down within the casing, and the catcher remains inactive at all times except when there is a rapid drop of the tubing, as when it breaks or is accidentally released.

11 designates a nipple or coupling or collar serving as a union between adjacent extremities of tubing sections or lengths, and the same is shown as provided with a lug 17 projecting within a slot 12 substantially in the form of an inverted L formed in the sleeve 15 which surrounds the sleeves 7 and 8 and is approximately concentric with the same and the tubing 1. Connected to the lower extremity of the sleeve 15 are outwardly bowed elongated springs 16 which frictionally engage the inner wall of the casing 2. When the lug 17 is in the short downwardly directed extension 17[a] on the short leg of the slot 12, which position the lug 17 is shown in Fig. 2 as about to assume, the catcher device is free to operate automatically and the tubing with such device may be moved up and down in the casing. When, however, the tubing is slightly raised to bring the lug into the position shown in Fig. 2 and the tubing is then turned so that the lug 17 can traverse the shorter leg of the L slot, and the tubing is then lowered so that the lug 17 travels down in the long vertical leg of the L slot, the upper end of the sleeve 15 is brought up against the bowed irons or arms 6 which in turn positively force the sleeve 7 and said bowed arms or irons 6 and the jaws or dogs 5 upwardly causing the jaws or dogs 5 to be wedged between the wedge surfaces or beveled faces 4 and the casing, so as to support the string of tubing and attendant features and prevent its being lowered or prevent its falling. By reversing these operations last mentioned, that is, with respect to the sleeve 15 and lug 17, and tubing 1, the lug may be brought back into the position first described, namely, within the slot extension 17[a], and the tubing catcher device will be restored to condition for automatic action. In the turning and raising or lowering of the tubing described the friction springs 16 hold the sleeve 15 against moving in the casing.

When the device has automatically operated to catch the tubing as described, it is obvious that the tubing may be released for further lowering by simply slightly raising it to relieve the jaws or dogs 5 from their wedged or jammed positions. They then resume their normal positions as shown in the drawing. The tubing and catcher may then be either raised or lowered in the casing. They may always be raised in the casing out of wedged condition.

The invention is capable of embodiment in extremely simple form, and may be conveniently combined with a string of well tubing as described, so that the well tubing becomes the nucleus or main frame of the tubing catcher device, without breaking its continuity.

Having thus disclosed my invention, I claim and desire to secure by Letters Patent:-

1. In combination with a well casing and a tubing disposed therein, slips operatively engaged with the tubing and adapted to coact with the casing, vibratory means for automatically imparting movement to the slips in one direction, said slips normally holding the vibratory means under compression whereby said slips are yieldably supported, a lug extending outwardly from the tubing, a sleeve surrounding said tubing and frictionally engageable with the casing, said sleeve being provided with an inverted L-shaped slot into which the lug of the tubing extends.

2. In combination with a well casing and a tubing disposed therein, slips operatively engaged with the tubing and adapted to coact with the casing, vibratory means for automatically imparting movement to the slips in one direction, said slips normally holding the vibratory means under compression whereby said slips are yieldably supported, a lug extending outwardly from the tubing, and a sleeve surrounding said tubing and frictionally engageable with the casing, said sleeve being provided with a slot disposed longitudinally of the tubing into which the lug of the tubing extends.

3. A device of the character disclosed, comprising an uninterrupted string of well tubing, a coil spring surrounding the well tubing, the well tubing being provided with a stop confining the lower end of the spring, as a dog or slip exerting its weight upon the spring and free to move lengthwise of the string of tubing under urge of the spring, the spring being normally somewhat compressed, and means upon the string serving to force the dog or slip outwardly coincident with an abrupt drop or lowering of the string of tubing; a tubular member being provided and surrounding the string of tubing and exerting its weight upon the spring, the slip or dog being connected with the tubular member.

4. A device of the character disclosed, comprising an uninterrupted string of well tubing, a coil spring surrounding the well tubing, the well tubing being provided with a stop confining the lower end of the spring, a dog or slip exerting its weight upon the spring and free to move lengthwise of the string of tubing under urge of the spring, the spring being normally somewhat compressed, and means upon the string serving to force the dog or slip outwardly coincident with an abrupt drop or lowering of the string of tubing; a tubular member being provided and surrounding the string of tubing and exerting its weight upon the spring, the slip or dog being connected with the tubular member; in combination with a well casing within which the tubing is disposed; the relative arrangement and construction of parts being such that upon abrupt drop or lowering of the tubing the dog or slip will be engaged with the casing to prevent further drop or lowering of the tubing.

5. A device of the character disclosed, comprising an uninterrupted string of well tubing, a coil spring surrounding the well tubing, the well tubing being provided with a stop confining the lower end of the spring, a dog or slip exerting its weight upon the spring and free to move lengthwise of the string of tubing under urge of the spring, the spring being normally somewhat compressed, and means upon the string serving to force the dog or slip outwardly coincident with an abrupt drop or lowering of the string of tubing; a weight member being provided and exerting its weight upon the spring, the slip or dog being connected with the last named member; in combination with a well casing within which the tubing is disposed; the relative arrangement and construction of parts being such that upon abrupt drop or lowering of the tubing the dog or slip will be engaged with the casing to prevent further drop or lowering of the tubing.

In testimony whereof, I have signed my name to this specification in the presence of two subscribing witnesses.

WILLIAM H. McKISSICK.

Witnesses:
J. C. STILLMAN.
J. D. McINTYRE.